UNITED STATES PATENT OFFICE.

OTIS HUTCHINS, OF NIAGARA FALLS, NEW YORK, ASSIGNOR TO THE CARBORUNDUM COMPANY, OF NIAGARA FALLS, NEW YORK, A CORPORATION OF PENNSYLVANIA.

REFRACTORY ARTICLE AND PROCESS OF MAKING THE SAME.

1,362,317. Specification of Letters Patent. Patented Dec. 14, 1920.

No Drawing. Application filed March 24, 1920. Serial No. 368,356.

*To all whom it may concern:*

Be it known that I, OTIS HUTCHINS, a citizen of the United States, residing at Niagara Falls, in the county of Niagara and State of New York, have invented a new and useful Improvement in Refractory Articles and Processes of Making the Same, of which the following is a full, clear, and exact description.

The present invention relates to highly refractory shaped articles and the process of making them. This material consists of a mixture of chromium ore or chromite and zirconia in varied proportions. This is formed into shaped articles by any of the well known methods and then burnt at a high temperature.

Chromite has for a long time been successfully used as a refractory. In the form of brick or granular material it has found extensive use in the metallurgical industry. Heretofore the principal bonding agents which have been employed have been finely ground chromite ore, lime, or a highly refractory fireclay. These chromite articles are exceedingly refractory and possess desirable chemical characteristics. However, they also possess a marked tendency to crack and spall when subjected to sudden changes of temperature, which necessitates restricting their use to a position where temperature changes are reduced to a minimum.

I have discovered that mixtures of chromite and zirconia, when formed into a refractory body and burned, have a very considerable resistance to cracking and spalling when subjected to sudden changes of temperature, and in this regard are considerably superior to chromite bricks made with other types of bonding material. This new refractory material also possesses marked chemical inactivity at high temperatures when in contact with corrosive slags.

In the preferred method of practising my invention I form into shaped bodies, by any well known method, a mixture of 90% of calcined chromite and 10% of zirconia. These bodies are burned at a high temperature in any kiln of suitable design. The burned articles are extremely hard and dense and possess a marked resistance toward fracture.

For the chromite material I prefer to use a "run of crusher" product, 8 mesh and finer containing as high percentage as possible of chromium oxid.

Chromium ores of various compositions work very satisfactory but it is preferable to use an ore which is high in chromium oxid and low in iron oxid.

For the zirconia I prefer to use a product known as "zirkite cement" which consists of a zirconium ore containing about 75% of zirconium oxid ground to a fine state of subdivision.

The specifications mentioned above may be modified very materially to produce articles desirable for certain applications. The chromite material may consist of calcined chromium ore, electrically fused chromium ore or purified chromium oxid. For the zirconia content I may use coarsely ground zirconium ore, purified zirconium oxid or electrically fused zirconium ore or oxid. I may also use a mineral known as "zircon" which consists largely of zirconium silicate, the commercial ore containing about 65% of zirconium oxid.

The relative proportions of chromite and zirconia may vary greatly and satisfactory products can be made containing from 5 to 75% of zirconia.

The invention is not limited to the preferred chromium and zirconium materials or the preferred proportions, but may be otherwise embodied within the scope of the following claims:—

I claim:

1. A shaped highly refractory article formed of a burned mixture containing zirconia and chromite.

2. A shaped highly refractory article formed of a burned mixture containing zirconia and fused chromite.

3. A shaped highly refractory article formed of a burned mixture containing zirconia and purified chromium oxid.

4. A shaped highly refractory article formed of a burned mixture containing chromium oxid and from 5 to 75% zirconia.

5. A shaped highly refractory article formed of a burned mixture containing crystallized zirconia and chromium oxid.

6. The process of making highly refractory articles which consists in mixing zirconia and chromium oxid, forming mixture into shaped articles, and burning the shaped articles.

7. The process of making highly refractory articles which consists in mixing zirconia and chromite, the particles of chromite being coarser than those of the zirconia, forming mixture into shaped articles, and burning the shaped articles.

8. A refractory article formed of a burned mixture containing an oxygen containing compound of zirconium and chromite.

9. The process of making highly refractory articles which consists in mixing an oxygen containing compound of zirconium and chromium oxid, forming the mixture into shaped articles, and burning the shaped articles.

In testimony whereof I have hereunto set my hand.

OTIS HUTCHINS.